UNITED STATES PATENT OFFICE.

FREDERICK W. ZERBAN, OF NEW ORLEANS, LOUISIANA, ASSIGNOR, BY MESNE ASSIGNMENTS, TO THE GOVERNMENT OF THE UNITED STATES AND TO THE PEOPLE THEREOF.

PROCESS OF MANUFACTURING DECOLORIZING-CARBON.

1,290,002.  Specification of Letters Patent.  Patented Dec. 31, 1918.

No Drawing.  Application filed August 30, 1918. Serial No. 252,119.

(DEDICATED TO THE PUBLIC.)

*To all whom it may concern:*

Be it known that I, FREDERICK W. ZERBAN, a subject of the Emperor of Germany, residing at New Orleans, in the State of Louisiana, (whose post-office address is Louisiana Sugar Experiment Station, New Orleans, Louisiana,) have invented a new and useful Process of Manufacturing Decolorizing-Carbon.

This application is made under act of March 3, 1883, chapter 143 (22 Stat. 625), and the invention herein described and claimed, may be used by the Government of the United States, or any of its officers or employees, in the prosecution of work for the Government, or by any person in the United States, without payment to me of any royalty thereon.

The object of my invention is to provide a process for the production of a carbon from kelp, which is highly efficient as an agent for the decolorization of sugar and fruit juices.

The best known carbons employed in decolorizing sugar juices, are norite and bone black. Norite, which is a foreign product, is not generally, if at all, used in this country, due to the non-availability of that material, which is more or less attributable to the present lack of facilities for the transportation of articles of import and the greatly increased freight rates incident to importation. Bone black is a carbon which is commonly used in this country for decolorizing sugar juices. Both norite and bone black are expensive, and sugar manufacturers are, and for a long time have been, interested in the development of a carbon which would be not only cheap, but more efficient than either norite or bone black.

From experiments and investigations which I have conducted, I have discovered that a carbon may be prepared from kelp, which is much more efficient in decolorizing sugar juices than either norite or bone black. Inasmuch as kelp is a sea product, growing abundantly along the Pacific coast, and is not harvested for use in any industry to any appreciable extent, but is merely employed slightly in the production of potash, it is in effect a waste product, and, as a result, a carbon can be prepared from that material which may be marketed at a low price.

In addition, I have discovered that a carbon may be prepared from kelp simultaneously with the use of that material in the preparation of potash. In other words, kelp may be employed in the manufacture of potash and at the same time may be used in the preparation of the decolorizing carbon. Carbon prepared from kelp and which is at the same time treated for the removal of the potash salts present therein, is just as efficient as a decolorizing agent as where the carbon is prepared from kelp according to my process without the extraction of the potash salts.

In practising my invention, I take kelp (*e. g. Macrocystis pyrifera*) and dry it thoroughly. Following this, I preferably grind or cut the kelp up into small sections or pieces, and place the ground or chopped material in an iron retort or other suitable receptacle provided with a free outlet for gases and carbonize the material in such vessel or chamber until the fumes evolved from such operation cease to be given off. The resultant char is then transferred to a closed iron receptacle and heated, preferably for two hours, to a bright red heat. It is then cooled. At this stage, the carbon or charred material contains large quantities of ash constituents which are partly soluble and partly insoluble in water, but entirely soluble in dilute acids, such as dilute hydrochloric acid, and which have helped or served to get the carbon into a state of fine subdivision. In order to develop the decolorizing power of the material, it is essential that the ash constituents consisting largely of water soluble salts, as the chlorids and sulfates of potassium and sodium, etc., and of the oxids or carbonates and other salts (phosphates, etc.,) of calcium, magnesium, iron, aluminium and the like, which are insoluble in water, be removed. This action is accomplished by treating the carbon with a suitable solvent. I do this, following the cooling operation, by boiling the char or carbon with a suitable acid, preferably dilute hydrochloric acid. The amount and strength of the acid used should be sufficient to dissolve both the water and acid soluble substances contained in the carbon and to impart to the solution a distinctly acid reaction.

I then wash the carbon with water for effecting the complete removal therefrom of the substances dissolved by the dilute hydrochloric acid. Washing the carbon with water will also remove any excess of acid in the material. The carbon may then be dried, but in either the moist or dry state it is now ready for use as a decolorizing agent.

In actual tests I find that carbon prepared from kelp according to the process specified produces, by its use on molasses and sugar solutions, a liquor containing only about one-third as much residual coloring matter as one obtained by employing equal quantities of norite, which is generally regarded as being the most effcient decolorizing agent used in the sugar industry.

Potash and decolorizing carbon may be made from kelp in one continuous operation. This result may be obtained by drying the kelp, then heating the dried material in a retort or other suitable chamber to red heat, or, as specified above, by drying the kelp, charring the dried material in a partly open vessel and then heating the resultant char to red heat in a closed receptacle. In either case the carbon obtained is then cooled and washed with water. The washing operation will effect the removal of the potash salts. The residue may then be boiled with acid, such as hydrochloric acid, washed with water and dried in the same way as I have hereinbefore described for the drying and preparation of carbon from kelp without recovering the potash salts present in such material. The carbon obtained by following the steps in either process will be the same, and will be just as efficient as a decolorizing agent.

In order, however, to employ the residue of kelp, herein referred to, for making a highly efficient decolorizing carbon, it is necessary that dried kelp or kelp char should first be heated to a red heat before extracting with water to remove the potash therefrom, or with acid to remove the potash and other ash constituents. I may add that in the manufacture of potash from kelp it is entirely advisable and practicable to heat kelp to a red heat prior to recovering the potash salts present therein. The heating of the kelp to red heat is pointed out not for the purpose of limiting or confining the scope of my process or invention to the treatment of residue from kelp heated to a red heat before leaching the kelp char with water to remove the potash salts or with acid to remove the potash salts and other ash constituents, but as indicating an essential step to be practised or followed in cases where the production of the most efficient carbon is desired. A carbon can, of course, be prepared from the kelp residue referred to, without further treating the dried kelp to a red heat before extracting with water to remove the potash, or with acid to remove the potash and other ash constituents, but a carbon prepared in this way will not, as stated, be as high in decolorizing power as when prepared from the residue of kelp where the kelp is first heated to a red heat before leaching the kelp char with water to remove the potash salts, or with acid to remove the potash salts and other ash constituents.

Furthermore, I do not limit or confine the scope of my invention to the specific steps hereinbefore set forth in the treatment of kelp for the production of a decolorizing carbon. Various changes and modifications of my process may be made or resorted to without departing from or sacrificing the spirit or scope of my invention. The particular process hereinbefore described is what I regard and consider, as the result of much experimentation, as the most preferable process to be followed in producing the most efficient decolorizing carbon from kelp. Kelp may be carbonized in any suitable receptacle and a char thus produced may, without previous heating in a closed receptacle, be treated with an acid, such as hydrochloric or other suitable acid, or even with water alone, washed, and if desired, dried.

In either case a decolorizing carbon will be obtained, but a carbon obtained in either of these ways will not be as efficient as a decolorizing agent as one prepared according to the specific steps of the process which I have hereinbefore described.

In practice, I have found that the best results in producing decolorizing carbon from kelp may be obtained when the raw material is carbonized quickly at a comparatively high temperature and in such a way that the fumes can freely escape during the period of carbonization. Carbonization alone is not sufficient, however, to make a highly efficient decolorizing carbon. The kelp material, after carbonization, should be treated to the highest temperature, full red heat, and the resulting carbon cooled and treated with hydrochloric acid and washed as hereinbefore more fully set forth.

Carbon prepared from kelp according to my process may be revivified by any method used in the revivification of other carbons.

Having thus described my invention, I claim:

A process of manufacturing decolorizing carbon from kelp, consisting in drying kelp and carbonizing said material, heating to a high temperature the carbon produced, then cooling said material, washing the resultant char with water for effecting the removal of the potash salts present therein, treating the residue with an acid and then washing it with water, substantially as specified.

In testimony, I affix my signature in the presence of two subscribing witnesses.

FREDERICK W. ZERBAN.

Witnesses:
HARRY B. CAPLAN,
W. E. BAGGATT.